United States Patent [19]

Germain

[11] 4,274,549

[45] Jun. 23, 1981

[54] APPARATUS FOR FUEL VAPOR RECOVERY

[75] Inventor: Lee A. Germain, Tallmadge, Ohio

[73] Assignee: The Goodyear Tire & Rubber Company, Akron, Ohio

[21] Appl. No.: 79,400

[22] Filed: Sep. 27, 1979

[51] Int. Cl.³ .............................................. B65B 3/18
[52] U.S. Cl. .................................. 220/86 R; 138/113; 138/114; 141/285; 220/85 VR; 285/133 R; 285/340
[58] Field of Search ............... 138/113, 114, 109, 148; 141/285, 286, 295; 220/85 VR, 86 R, 366; 285/133 R, 158, 340

[56] References Cited

U.S. PATENT DOCUMENTS

| | | | |
|---|---|---|---|
| 3,581,776 | 6/1971 | Sheahan | 138/113 X |
| 3,924,882 | 12/1975 | Ellis | 285/340 X |
| 4,122,968 | 10/1978 | Germain | 141/285 X |

Primary Examiner—Frederick R. Schmidt
Attorney, Agent, or Firm—D. M. Ronyak; L. A. Germain

[57] ABSTRACT

A filler neck assembly is mounted to a fueling port at one end and to a fuel tank through a tank entry nipple at the opposite end, which assembly provides a fuel path into the tank and a vapor recovery path out of the tank while being serviced from a fuel dispensing nozzle having vapor recovery means. The filler neck comprises a fuel delivery tube connected to the fueling port and to the inside of the tank through a baffle within the tank entry nipple. The baffle securely seats the tube within the tank. The fuel delivery tube is coaxially mounted within the bore of an outer tube having ribs on the inside surface of its bore, the outer tube also being connected to the fueling port and to the tank entry nipple. In a second embodiment the ribs are on the outside surface of the inner fuel delivery tube while the bore of the outer tube is a smooth surface. In either embodiment the tubes are connected to the fueling port and to the inside of the tank entry nipple and the relationship of the two tubes and the tank baffle is such as to provide a vapor path between the tubes from the tank to the dispensing nozzle vapor recovery means via the valleys defined by ribs such that the vapor may be returned to the source supply of fuel.

15 Claims, 7 Drawing Figures

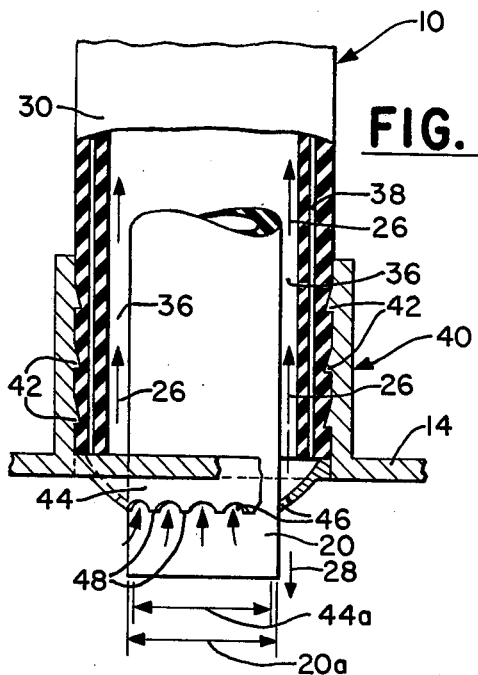

APPARATUS FOR FUEL VAPOR RECOVERY

BACKGROUND OF THE INVENTION

This invention generally relates to fuel vapor recovery systems and more particularly to a filler neck assembly and tank inlet configuration therefor that provides a vent path for the recovery of fuel vapor generated in the operation of filling a fuel tank by a dispensing nozzle having means for drawing the vapor back into the source supply of fuel.

In the activity of refueling tanks, whether of the vehicle type or of the stationary above or below ground types, fuel loss in the form of vapor is of increasing concern, not only because of its polluting affect and obvious hazard but also because of the waste. In this circumstance, manufacturers have concentrated efforts in the development of vapor recovery pumps and nozzles and numerous type of filler tube venting arrangements which connect between the tank being serviced and the entry port accepting the fuel delivery nozzle. These venting arrangements have usually included a vent tube that is either connected externally of the filler tube or else mounted within the bore of the filler tube. In the case of an external vent tube, multiple connections are required at the entry port and also at the tank and this arrangement further increases the cost and makes the vent vulnerable to damage. In the case of an internal vent tube ie. mounted within the bore of the filler tube, the vent is subject to being blocked by the rising fuel in the tank while also increasing the manufacturing cost by reason of the manner of affixing the vent within the filler tube.

Descriptions of these prior art devices and techniques may be had by way of the following U.S. Pat. Nos. 3,187,936 (06/08/65) to K.D. Downing; 3,369,695 (02/20/68) to L.D. Johnson; 4,009,739 (03/01/77) to D. J. Weatherford; 4,122,968 (10/31/78) to L.A. Germain; and 4,135,562 (01/23/79) to Martineau et al.

This invention expands the prior art as exemplified in my U.S. Pat. No.4,122,968 issued Oct. 31, 1978 which describes a tube-within-a-tube concept for fuel vapor recovery. The filler neck of the subject patent comprises a fuel delivery tube having a plurality of ribs on it's outside surface and which is connected into the inside of a conventional tank entry nipple. A sleeve tube is slipped over the fuel delivery tube in a coaxial relationship and is connected at one end to the fueling port and at the opposite end to the outside of the tank entry nipple. The relationship between the two tubes and the tank entry nipple is such that a vapor path exists in the valleys defined by the ribs and thus the fuel vapor that is generated in the filling of the tank may be drawn up through the path provided between the tubes by a nozzle having means for returning the vapors to the source supply.

An aspect of the present invention therefor is to provide a filler neck assembly of the coaxial tube-within-a-tube configuration wherein the assembly may be applied to installations requiring a complex curvature of the tubes such as for example within the bodywork of a vehicle. In this type installation the outer tube will be formed or molded to the required complex curved shape while the bore configuration is such as to readily receive a fuel delivery tube that is connected into the tank entry nipple. A further aspect of invention also proposes a tank entry nipple and inlet configuration that simplifies installation of the filler tube assembly while also providing a secure crashworthy connection.

SUMMARY OF THE INVENTION

Various advantages of the invention are met in afiller neck assembly comprising a fuel delivery tube having a bore diameter sufficient for receiving a fuel dispensing nozzle therein and which is connected into the tank entry by way of an inlet baffle that acts to secure the tube within the tank. The baffle provides a vapor path through ports within its configuration and also provides a resistance to withdrawal of the fuel delivery tube upon its insertion through the baffle. An outer tube is provided having lobes or ribs on the inside surface of its bore and it is also mounted within the tank inlet nipple. The arrangement of the two tubes is such as to provide venting of the vapors between the tubes when they are mounted coaxially one-within-the other.

In a second aspect of the invention, the lobes or ribs are provided on the outside surface of the fuel delivery tube while the outer tube bore is a smooth surface. The ribs are stripped from the fuel delivery tube for a short distance for insertion and seating in the tank inlet baffle and both tubes are mounted to the inside of the tank inlet nipple and a vapor return path provided between the two coaxially oriented tubes.

BRIEF DESCRIPTION OF THE DRAWINGS

The various aspects and advantages of the invention will be appreciated from a consideration of the detailed description that follows in conjunction with the accompanying drawings in the several figures in which like parts bear like reference numerals.

FIG. 3 is an elevational view, in section, illustrating the tank inlet and baffle configuration as it applies to the coaxially arranged tubes;

FIG. 4 is an elevational view in section illustrating a second embodiment of the invention;

FIG. 5 is a sectional view as taken on line 5—5 of FIG. 4;

FIG. 6 is a sectional view similar to that of FIG. 2 but wherein the outer tube is a corrugated metal structure; and FIG. 7 is a sectional view similar to that of FIG. 5 but wherein the outer tube is metal tube that may be formed in a complex curved configuration.

BRIEF DESCRIPTION OF THE INVENTION

Figure 1:
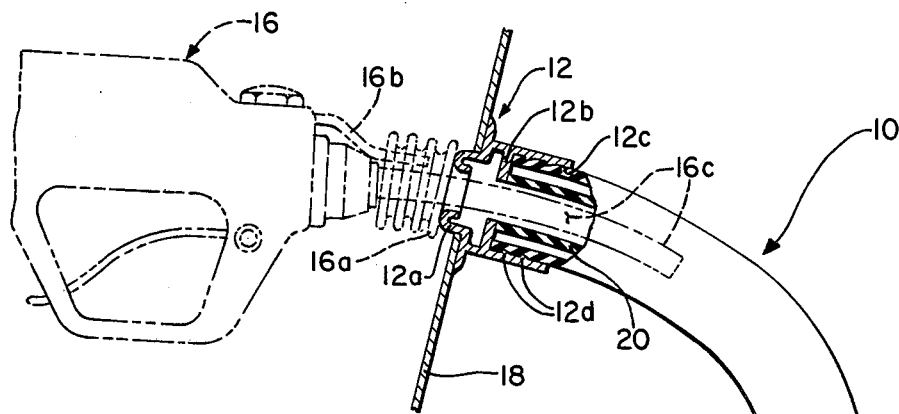
FIG. 1 is an elevational view, with portions broken away, illustrating the filler neck assembly comprising the invention with the delivery nozzle and fuel tank being shown in ghost lines.
Figure 2:
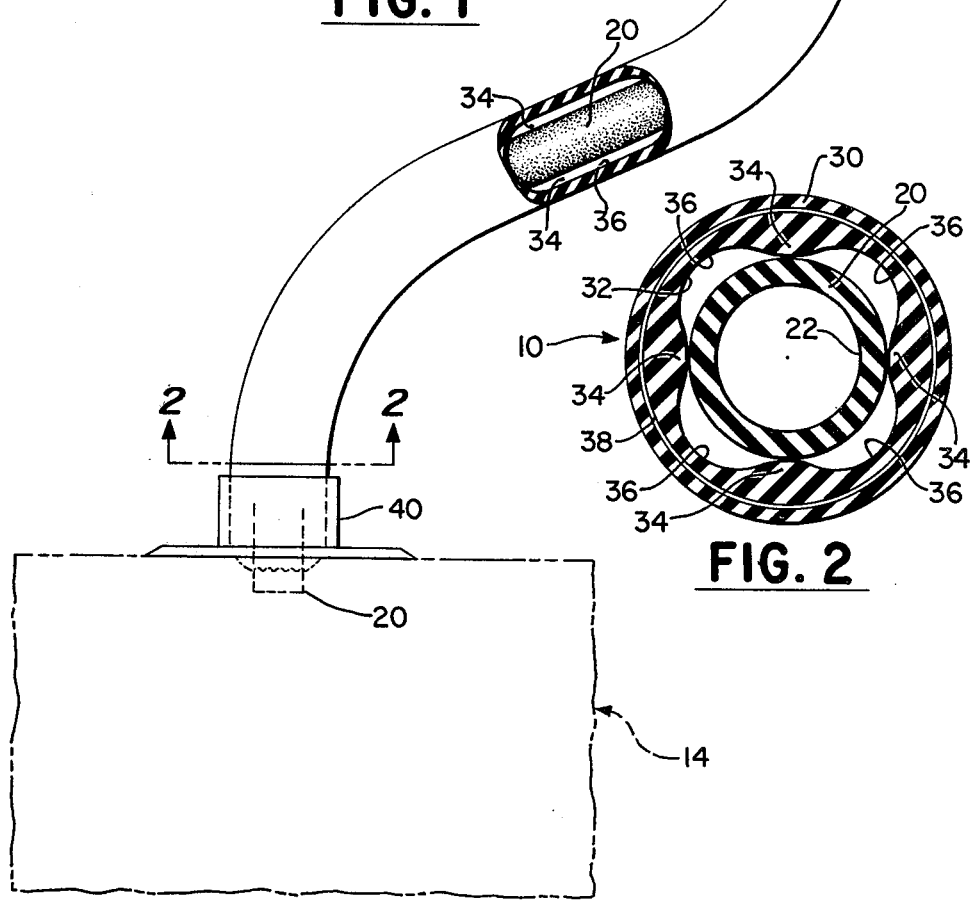
FIG. 2 is a sectional view as taken on line 2—2 of FIG. 1.

Referring to FIGS. 1, 2, and 3 of the drawings, the filler neck assembly comprising the invention is illustrated and generally indicated by reference numeral 10. The filler neck assembly 10 is mounted between an entry port connection 12 and a fuel tank 14 and serves to direct fuel into the tank from a fuel dispensing nozzle 16, the tank and nozzle being within the state of the art and therefore shown in ghost lines. The dispensing nozzle 16 incorporates apparatus 16a for sealing the entry port 12a and also apparatus 16b for vacuum return of fuel vapors that may be generated in the fuel dispensing operation. The fuel vapors are returned to the source supply of fuel and recondensed and thus recaptured instead of lost to the atmosphere as was the usual condition in earlier systems.

A section through the filler neck assembly is illustrated in FIG. 2 and as shown the assembly comprises a fuel delivery or inner tube 20 and an outer tube 30. The inner tube 20 is characterized by a bore 22 of sufficient diameter to accept the exit pipe 16c of the dispensing nozzle 16, which tube may be an extrusion of a fuel resistant elastomer that is also sufficiently flexible to be inserted through the bore 32 of the outer tube 30 and thus follow the complex contour of the tube 30. The inner tube 20 is connected to the entry port 12 through its association with the outer tube 30 and is connected to the fuel tank 14 by means of the tank entry nipple 40 which will be described in more detail hereinafter. The outer tube 30 may be formed to the desired complex curvature required and in this respect it may have several bends approaching 90 degrees so as to conform to the space requirements within the vehicle bodywork. The tube 30 therefore may be a formed metal pipe or a molded fabric-reinforced elastomeric hose. In either case, the tube 30 is characterized by ribs 34 formed within its bore 32, which ribs define valleys 36 instrumental in the vapor recovery process. The diameter of the outer tube bore 32 as measured between the ribs 34 is slightly larger than the outside diameter of the inner tube 20 so the two tubes may be easily assembled in a coaxial relationship one-within-the-other and the ribs 34 and valleys 36 form a pathway indicated by arrow 26 between the two tubes for the return of fuel vapor from the tank 14 to the vapor recovery nozzle 16. It is envisioned that when the tube 30 is in an elastomeric configuration, it will be reinforced with a suitable fabric 38 and mandrel cured to the desired complex curved shape. Upon being stripped from the mandrel and cooled in the conventional manner, the tube 30 remains in the desired curved configuration. Thus, upon completion of the outer tube 30, the inner tube 20 is inserted within the bore 32 and the filler neck assembly may be shipped as a single unit for installation. Installation of the tubes at the entry port 12 may be accomplished by any of various methods, the drawing of FIG. 1 illustrating just one as an example. As shown the inlet port 12 comprises a tubular inlet 12a that conventionally mounts a closure cap (not shown) and which may be welded or fastened to the vehicle bodywork 18 in the usual manner. The inlet nipple 12a may carry radially oriented stops 12b within its bore 12c that limit the extent of insertion of the tubes 20 and 30 while providing vapor flow return for pick up by the nozzle means 16b. The bore 12c may also have a plurality of ribs 12d for securing the tube 30 therein. Thus it may be appreciated that the inlet port connection 12 may require only a force-fit to secure the filler neck assembly thereto. In this respect the ribs 12d may securely hold the assembly in its normal use but may provide for easy separation in a crash situation whereupon the inlet port 12 and vehicle body material 18 may be ripped away from the filler neck tubes 20, 30. In this circumstance the integrity of the assembly will be maintained by the tank entry connection which will be described in detail hereinafter.

Securing of the filler neck assembly 10 to the tank 14 is provided by a tank inlet 40. The inlet 40 is a standard tubular nipple having ribs 42 on the inside bore surface and having a bore diameter slightly smaller than the outside diameter of the filler neck tube 30 such that a force fit engagement is realized between the two. The tank inlet 40 is further charcterized by a baffle 44 mounted within the inlet and which has port means 46 for passage of fuel vapors there through when such are generated in the filling of the tank 14. The diameter of the baffle bore 44a is slightly smaller than the outside diameter 20a of the inner tube 20 such that the tube is force fit within the baffle. In this respect, the baffle provides means 48 that grip the outside surface of the tube 20 such that the tube may be easily inserted in the baffle opening in the tank direction 28 but which requires a much greater force to withdraw it from the baffle in the opposite direction.

FIG. 6 illustrates an alternative embodiment of the invention shown in FIGS. 1–3. In this case the outer tube is a currogated metal tube 50 that may be drawn to the complex curved configuration required for a particular installation. In this configuration the corrugations form the ribs and valleys for creating a vapor return pathway 54 between the two tubes 20 and 50. Connection of the filler neck assembly may be made to the entry port 12 and the tank 14 by providing corrugated nipples that match the currugations of the tube 50 such as illustated by the ghost line showing at 52. Of course the inner tube 20 is an elastomeric hose tube that is mounted in the bore of the tube 50 and force fit into a tank inlet baffle 44 while the outer currogated tube 50 is match-fit into a corrugated tank inlet nipple 52. Securing of the outer tube 50 into the tank nipple 52 may be made by either a force-fit matched engagement of the two and/or supplemented by spot welds at their interface. It will be appreciated that in this configuration the filler neck asembly lends itself to stationary above or below-ground installations since the rigidity of the assembly is enhanced by the corrugated metal outer tube 50.

It is further anticipated that the inner tube 20 of FIG. 2 may be formed to a specific complex curved configuration and in this respect may comprise a molded fabric reinforced elastomeric hose or else a formed metal tube. In either case the outer tube 30 will be a non-reinforced extruded elastomeric hose tube having longitudal ribs on the surface of its bore which define valley pathways for the return of fuel vapor from the tank when the two tubes are mounted coaxially one-within-the-other. Of course, the bore diamter of outer tube as measured from the tops of the ribs will be slightly greater than the outside diameter of the inner tube to facilitate its being slipped over and follow their contours of the inner tube. In this circumstance the ribs may be spiralled within the outer tube bore to effect bending of the outer tube as it is mounted on the inner tube.

Turning now to FIGS. 4, 5 and 7, a further embodiment of the invention is illustrated and in this embodiment the tank inlet nipple 40 and baffle 44 are the same and the outer tube may also be in either elastomeric or metal configurations. In this case however, the outer tube 60 has a smooth surfaced bore 62 and the ribs and valleys are created by the configuration of an inner tube 56 that carries ribs 58 on its outer surface. Of course the smooth bore 62 of the outer tube 60 creates valley pathways between the two tubes for vapor return out of the tank 16. The inner tube 56 is envisioned as an elastomeric extrusion with the ribs being formed by an appropriate die during the extrusion process. Furthermore the ribs may or may not be spiralled but spiralling is considered to make installation of the tube 56 in the bore 62 of the outer tube 60 easier especially when the outer tube takes on a complex curved shape. Installation of the tube 56 in the tank inlet 40 is accomplished in the same manner of the previous configuration except that a portion of the ribs 58 at the end of the tube are stripped off such as at 58a to facilitate seating of the tube in the baffle 44. The number and spacing of the ribs is considered a matter of choice dependent upon the volume of vapor required to be vented and it will also be appreciated that in this configuration the ends of the ribs 58b provide a stop at the baffle to limit the extent of insertion of the tube 56 into the fuel tank. FIG. 7 illustrates the configuration of FIG. 5 except in this case the outer tube is metal drawn to the required complex curved shape for the particular installation.

While certain representative embodiments and details have been shown for the purpose of illustrating the invention, it will be apparent to those skilled in the art that various changes and modifications may be made therein without departing from the spirit or scope of the invention.

I claim:

1. Apparatus mounted in association with an entry fueling port and a fuel tank having an inlet nipple, said apparatus providing fuel entry into the tank and recovery of fuel vapor from the tank while being serviced from a fuel dispensing nozzle having vapor recovery means and comprising:

inner and outer coaxially aligned tubes, the inner tube a fuel delivery tube having a bore diameter sufficient for receiving the dispensing nozzle therein and the outer tube characterized by a plurality of longitudinal ribs formed on the inside surface of its bore such as to define a plurality of valley-pathways between the coaxially aligned tubes, said tubes connected to the entry fueling port and to the inside of the tank inlet nipple; and baffle means mounted within the bore of the tank inlet nipple to receive fuel delivery tube in a locking engagement and provide fuel entry into the tank as dispensed from the nozzle, said baffle having a bore slightly smaller than the outside diameter of the fuel delivery tube to provide a force-fit engagement with said tube when it is inserted therethrough in the tank direction but which opposes extraction thereof in the opposite direction, and having a plurality of access ports about its periphery to provide a vapor path from the tank to the valley-pathways between the tubes and to the nozzle vapor recovery means.

2. The apparatus as set forth in claim 1 wherein the inner fuel deliery tube is an elastomeric extrusion and the outer tube is a fabric reinforced elstomeric tube molded to a specific configuration.

3. The apparatus as set forth in claim 1 wherein the access ports are configured into the baffle bore to define a plurality of fingers that engage the outside surface of the fuel delivery tube such that the tube may be easily inserted through the baffle in the tank direction but which oppose removal of the tube in the opposite direction.

4. The apparatus as set forth in claim 1 wherein the outer tube is a corrugated metal tube drawn to a specific comfiguration and the fuel delivery tube is of an elastomeric material compounded for its resistance to the affects of hydrocarbon fuels.

5. The apparatus as set forth in claim 1 wherein the inner fuel delivery tube is a fabric reinforced elastomeric tube molded to a specific configuration and the outer tube is an elastomeric extrusion of sufficient flexibility to be slipped over the inner tube.

6. The apparatus as set forth in claim 1 wherein the inner fuel delivery tube is a metal tube formed to a specific configuration and the outer tube is an elastomeric extrusion having longitudinal ribs formed on the inside surface of its bore.

7. The apparatus as set forth in claim 6 wherein the ribs are spiralled and the diameter of the bore between the rib peaks is sufficiently larger than the outside diameter of the inner tube so as to effect ease of mounting the outer tube over the inner tube in a coaxial relationship.

8. Apparatus mounted in association with an entry fueling port and a fuel tank having an inlet nipple, said apparatus providing fuel entry into the tank and recovery of fuel vapor from the tank while being serviced from a fuel dispensing nozzle having vapor recovery means and comprising:

inner and outer coaxially aligned tubes, the inner tube a fuel delivery tube of an elastomeric material exhibiting a resistance to the affects of hydrocarbon fuels and having a bore diameter sufficient for receiving the dispensing nozzle therein and the outer tube of a fabric reinforced elastomeric material molded to a specific configuration and having a plurality of longitudinal ribs formed on the inside surface of its bore such as to define a plurality of valley-pathways between the coaxially aligned tubes, said tubes connected to the entry fueling port and to the inside of the tank inlet nipple; and baffle means mounted within the bore of the tank inlet nipple and having a bore diameter for receiving the inner fuel delivery tube therein in a locking engagement and a plurality of vent ports formed therein, said baffle providing fuel entry into the tank via the inner tube as dispensed from the nozzle while also providing a vapor path from the tank via the vent ports to the valley-pathways between the tubes and to the nozzle vapor recovery means.

9. The apparatus as set forth in claim 8 wherein the vent ports are formed at the innermost peripheral edge of the baffle bore, which ports form a plurality of fingers that engage the outside surface of the fuel delivery tube such that the tube may be easily inserted through the baffle in the tank direction but which oppose extraction of the tube in the opposite direction.

10. Apparatus mounted in association with an entry fueling port and a fuel tank having an inlet nipple, said apparatus providing fuel entry into the tank and recovery of fuel vapor from the tank while being serviced from a fuel dispensing nozzle having vapor recovery means and comprising:

inner and outer coaxially aligned tubes, the outer tube connected to the fueling port and to the inside of the tank inlet nipple and having a bore diameter sufficient for receiving the inner tube therein, the inner tube a fuel delivery tube having a bore diameter sufficient for receiving the dispensing nozzle therein and having a plurality of longitudinally oriented ribs about its outside surface defining a plurality of valley-pathways between the tubes; and baffle means mounted within the bore of the tank inlet nipple and having a bore for receiving the fuel delivery tube therein in a manner to oppose its extraction therefrom and having a plurality of vent ports formed about its periphery so as to provide communication between the tank and the valley-pathways.

11. The apparatus as set forth in claim 10 wherein the outer tube is of a fabric reinforced elastomer molded to a specific configuration and the inner fuel delivery tube is an elastomeric tube compounded for a resistance to the affects of hydrocarbon fuels.

12. The apparatus as set forth in claim 11 wherein the ribs on the inner tube are stripped off for a short length from the end and the baffle vent ports are configured in the baffle bore to form a plurality of fingers that engage the inner tube in that length such that the tube may be easily inserted through the baffle in the tank direction but which oppose extraction thereof in the opposite direction.

13. The apparatus as set forth in either of claims 11 or 12 wherein the ribs are spiralled on the outside surface of the inner tube.

14. The apparatus as set forth in claim 10 wherein the outer tube is of metal formed to a specific configuration and the inner fuel delivery tube is of an elastomer compounded for a resistance to hydrocarbon fuels.

15. The apparatus as set forth in claim 10 wherein the inner fuel delivery tube is a corrugated metal tube formed to a specific configuration and the outer tube is an elastomeric extrusion.

* * * * *